US012030337B2

(12) United States Patent
Bez et al.

(10) Patent No.: US 12,030,337 B2
(45) Date of Patent: Jul. 9, 2024

(54) REFILLABLE FREE INK WRITING INSTRUMENT, KIT COMPRISING SUCH A WRITING INSTRUMENT, AND METHOD THEREOF

(71) Applicant: SOCIÉTÉ BIC, Clichy (FR)

(72) Inventors: Arnaud Bez, Clichy (FR); Etienne Roudaut, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 0 days.

(21) Appl. No.: 18/041,651

(22) PCT Filed: Aug. 30, 2021

(86) PCT No.: PCT/EP2021/073834
§ 371 (c)(1),
(2) Date: Feb. 14, 2023

(87) PCT Pub. No.: WO2022/043541
PCT Pub. Date: Mar. 3, 2022

(65) Prior Publication Data

US 2023/0311557 A1 Oct. 5, 2023

(30) Foreign Application Priority Data

Aug. 31, 2020 (EP) .................................... 20305962

(51) Int. Cl.
*B43K 5/03* (2006.01)
*B43K 7/02* (2006.01)

(52) U.S. Cl.
CPC . *B43K 5/03* (2013.01); *B43K 7/02* (2013.01)

(58) Field of Classification Search
CPC ... B43K 5/03; B43K 7/02; B43K 5/00; B43K 5/02; B43K 5/10; B43K 7/04; B43K 11/00
USPC ..................................................... 401/40, 41
See application file for complete search history.

(56) References Cited

U.S. PATENT DOCUMENTS

| | | | | |
|---|---|---|---|---|
| 1,164,157 | A | 12/1915 | Zollinger | |
| 1,947,092 | A | 2/1934 | Kingman | |
| 11,697,302 | B2 * | 7/2023 | Roudaut | B43K 1/003 401/40 |

FOREIGN PATENT DOCUMENTS

| | | | |
|---|---|---|---|
| CN | 104875525 | A | 9/2015 |
| CN | 108045130 | A | 5/2018 |
| GB | 2464705 | A | 4/2010 |
| KR | 101463927 | B1 | 11/2014 |

OTHER PUBLICATIONS

International Search Report and Written Opinion issued in International Application No. PCT/RP2021/073834 on Jul. 10, 2021 (9 pages).

* cited by examiner

*Primary Examiner* — David J Walczak
(74) *Attorney, Agent, or Firm* — Bookoff McAndrews, PLLC

(57) ABSTRACT

A refillable free ink writing instrument including a body having a rear end, a front end and an ink reservoir disposed between the rear end and the front end, a writing tip mounted on the front end and a plug mounted on the rear end, wherein the plug is configured to close an opening in fluid communication with the ink reservoir, the plug being configured to be removable from the rear end to refill the ink reservoir with water and concentrated ink refill.

17 Claims, 11 Drawing Sheets

REFILLABLE FREE INK WRITING INSTRUMENT, KIT COMPRISING SUCH A WRITING INSTRUMENT, AND METHOD THEREOF

CROSS-REFERENCE TO RELATED APPLICATIONS

This patent application is the U.S. national phase entry under 35 U.S.C. § 371 of priority to International Application No. PCT/EP2021/073834, filed on Aug. 30, 2021, now published as WO 2022/043541 A1, which claims benefit from European patent application EP20305962.1, filed on Aug. 31, 2020, its content being incorporated herein by reference.

TECHNICAL FIELD

The present disclosure relates to a refillable free ink writing instrument, a kit comprising the refillable free ink writing instrument and a method for refilling a refillable free ink writing instrument.

A "free ink writing instrument" or "writing instrument having a free ink reservoir" is a writing instrument wherein the ink is free to circulate in the reservoir. In other words, the ink circulates immediately on one side or on the other side of the reservoir, for example due to gravity. In particular, it is understood that the ink may circulate when handling or moving the writing instrument. Downstream the reservoir, the ink may feed any type of device or writing tip, for example writing tip comprising fibrous bundle, capillarity duct, felt duct/tip, or the like.

BACKGROUND

Traditional writing instrument have a limited lifetime, for example because the ink has been used so that the reservoir is empty. Therefore, some writing instruments may be refillable. However, refilling may be not so easy and may be messy. Therefore, a need exists to provide a writing instrument having an extended lifetime, and which is user-friendly.

SUMMARY

In embodiments, a refillable free ink writing instrument comprises a body having a rear end, a front end and an ink reservoir disposed between the rear end and the front end, a writing tip mounted on the front end and a plug mounted on the rear end, wherein the plug is configured to close an opening in fluid communication with the ink reservoir, the plug being configured to be removable from the rear end to refill the ink reservoir with water and concentrated ink refill.

The writing instrument may be a pen, a marker, a writing felt pen, a ball pen, a needle pen, a coloring felt pen, a permanent marker, a dry wipe marker, etc.

The writing tip may be made of felt (for example acrylic, nylon, polyester plus resin, etc.), foam, sintered material such plastic or the like, plastic plus metal tip for ball pen or needle tip pen, etc. The writing tip is fed directly or indirectly (i.e. via a duct) by the reservoir.

The opening may open directly into the reservoir or into an intermediate duct fluidly connecting the opening to the reservoir.

The concentrated ink refill may be liquid or solid (such as powder, grain(s), granule(s) or pellet(s), etc.).

When removing the plug, the reservoir may be directly refilled via the opening by providing water and concentrated ink refill. Thus, the free ink writing instrument (hereafter, and unless otherwise specified, "the writing instrument") may be easily refilled, thereby extending its lifetime. In addition, refilling the writing instrument via the opening disposed on the rear end is easy. For example, concentrated ink may be provided on the one hand and water may be provided on the other hand, in any orders, which permits an easy convenient and clean refill.

In embodiments, the plug may be mounted onto the rear end via a screwed, bayonet or snap fitting system.

In embodiments, the plug may be provided with a locking system. Such a locking system may avoid unwanted removing of the plug. In other words, such a locking system may avoid unintentional actuation of the plug.

For example, the screwed, bayonet or snap fitting system may be provided with a backstop system allowing easy assembling but requiring relatively high force for disassembling. The relatively high force may be higher than the force needed for mounting. For example, the plug may be provided with a specific shape or indentation(s), such as a screw head or the like, in order to be only disassembled (or disassemble/assembled) with the help of a specific tool, such as a screwdriver or the like.

In embodiments, the rear end and/or the plug may be provided with a seal. Such a seal may avoid ink leakage from the ink reservoir. For example, the snap fitting system may comprise an annular rib, the annular rib forming the seal.

In embodiments, the plug may comprise a portion configured to be in fluid contact with the ink reservoir, the portion comprising the concentrated ink refill.

In embodiments, the portion may comprise a cavity configured to store concentrated ink refill.

In embodiments, the concentrated ink refill may comprise one or more solid grains or granules, the cavity may be closed by a grid.

For example, the grid may be permanent and not movable. The grid is configured to block the grain(s) or granule(s) into the cavity when not dissolved (i.e. configured to close the cavity with regard to the one or more solid grains or granules of concentrated ink), but allows a fluid to pass therethrough in order to dissolve the concentrated ink grain(s) or granule(s). For example, the cavity may be delimited by a cage.

If the user forgot to refill with water, the plug may be removed without any issues (concentrated ink remains inside the cavity) and water may be refilled.

In embodiments, the concentrated ink refill may comprise a powder and/or one or more solid grains or granules, and the cavity may be closed by a water-soluble membrane seal.

If the user forgot to refill with water, the plug may be removed without any issues (concentrated ink remains inside the cavity) and water may be refilled.

In embodiments, the concentrated ink refill may comprise a liquid, a powder and/or one or more solid grains or granules, the cavity may be closed by breakable membrane seal.

In embodiments, the body may comprise one or more sharp elements configured to cut the breakable membrane seal when mounting the plug onto the rear end so as to open the cavity.

"Breakable" should be understood as "breakable with less force than needed for breaking the rest of the plug". The breakable membrane seal may be made of paper, plastic, metal or association of several materials (i.e. composite material). For example, the breakable membrane seal may be made of several layers of different materials. The breakable membrane seal may be configured to prevent air pollution and/or humidity to penetrate into the cavity. The breakable membrane seal may prevent user to touch the concentrated ink refill.

For example, the breakable membrane seal or the water-soluble membrane seal are configured to open the cavity when the plug is mounted onto the rear end. In other words, the cavity is closed by the breakable membrane seal or the water-soluble membrane seal when the plug has never been mounted on the rear end while the cavity is open (i.e. breakable membrane seal is at least in part broken or the water-soluble membrane seal is at least in part dissolved) when the plug has been mounted onto the rear end.

In embodiments, the concentrated ink refill may comprise a liquid, a powder and/or one or more solid grains or granules, the cavity may be closed by a movable cover.

In embodiments, the body may comprise one or more moving element configured to move the cover when mounting the plug onto the rear end so as to open the cavity.

For example, the movable cover may have at least a first configuration, for example when the plug is not mounted onto the rear end, wherein the cavity is fully closed, and a second configuration wherein the cavity is open at least in part when the plug is mounted onto the rear end. For example, the cover may be moved when mounting the plug onto the rear end. For example, the cover may be a sacrificial portion which is broken, cut, or removed when mounting the plug for the first time. In examples, the cover may have a slidable or rotatable portion opening/closing a hole when assembling/disassembling the plug to/from the rear end. For example, the cover may be a plate, for example a rotatable disc, having at least one through hole, or may be a piston.

For example, when the cover is a sacrificial portion, the moving element may be configured to broke/cut/pull out/remove/unclip/loose/tilt or the like the sacrificial portion. For example, when the cover is a rotatable disc, the moving element may be a protrusion configured to block the rotation of the rotatable disc with regard to the body when mounting the plug. For example, the when cover is a piston, the moving element may be an abutment configured to block the piston along an axis of the body with regard to the body when mounting the cover.

For example, the cavity may be delimited by one or more wall(s) having no hole, and may have a single opening. The single opening may be closed by the grid or the breakable membrane seal or the water-soluble membrane seal or the movable cover. In a variant, the single opening may be closed by the grid while at least another wall in fluid contact with the reservoir may comprise another grid. For example the cavity may be formed by the inner space of a cage.

In embodiments, the opening may be provided with a sealing membrane having one or more cuts, and the sealing membrane may be configured to prevent ink from flowing out of the ink reservoir and to allow introduction of water and of the concentrated ink refill into the ink reservoir.

For example, the one or more cuts allow elastic deformation of the sealing membrane when a predetermined pressure is applied thereto, thereby creating an open passage during a working state or open position. The membrane is thus configured to adopt two states, a working state or open position in which it allows introduction of water and of the concentrated ink refill into the reservoir and a rest state or rest position in which the membrane seals the opening. Such a membrane is known as such by the skilled person.

In embodiments, the plug comprises a pushing portion configured to push a solid concentrated ink refill through the membrane when mounting the plug onto the rear end.

For example, the pushing portion may be a protrusion or an abutment acting as a pusher pushing a refill through the cuts of the sealing membrane when mounting the plug onto the rear end.

In embodiments, the opening may be provided with a cartridge receiving portion having an opening portion and the plug may comprise a pushing portion configured to move toward the opening portion of the cartridge receiving portion when mounting the plug onto the rear end. This way, when a concentrated ink refill is needed, the pushing portion is configured to push a cartridge containing the ink refill toward the opening portion of the cartridge receiving portion when mounting the plug onto the rear end in order to break a portion of the cartridge and free the concentrated ink refill into the ink reservoir.

For example the cartridge may comprise a concentrated ink refill. The opening portion may be configured to open the cartridge when the cartridge is pushed against the opening portion.

In embodiments, a kit comprise a refillable free ink writing instrument comprising a body having a rear end, a front end and an ink reservoir disposed between the rear end and the front end, a writing tip mounted on the front end and a plug mounted on the rear end, wherein the plug is configured to close an opening in fluid communication with the ink reservoir, the plug being configured to be removable from the rear end to refill the ink reservoir with water and concentrated ink refill, and one or more concentrated ink refills, each of the one or more concentrated ink refills being packed in one of a hydrosoluble pouch, a porous pouch, a meshed pouch, a cage, or a capsule forming a cavity closed by a grid, a breakable membrane seal, a water-soluble membrane seal, or a movable cover.

In embodiments, each of the one or more concentrated ink refills may be packed in a capsule configured to be mounted onto a portion of the plug configured to be in fluid contact with the ink reservoir.

In embodiments, each of the one or more refills may be packed in a capsule having a shape of a funnel for refilling water into the reservoir.

For example, the capsule may have an annular shape defining an annular cavity configured to store concentrated ink, and a central hole having a shape of a funnel.

In embodiments, a kit comprises a refillable free ink writing instrument comprising a body having a rear end, a front end and an ink reservoir disposed between the rear end and the front end, a writing tip mounted on the front end and a plug (i.e. a first plug) mounted on the rear end, wherein the plug is configured to close an opening in fluid communication with the ink reservoir, the plug being configured to be removable from the rear end to refill the ink reservoir with water and concentrated ink refill, wherein the plug comprises a portion configured to be in fluid contact with the ink reservoir, the portion comprising a cavity configured to store concentrated ink refill, according to any one of the embodiment of the present disclosure, and one or more additional plugs similar to the (first) plug, wherein each of the one or more additional plugs is packed in an air-tight pouch.

In embodiments, a kit comprises a refillable free ink writing instrument comprising a body having a rear end, a front end and an ink reservoir disposed between the rear end and the front end, a writing tip mounted on the front end and a plug mounted on the rear end, wherein the plug is configured to close an opening in fluid communication with the ink reservoir, the plug being configured to be removable from the rear end to refill the ink reservoir with water and concentrated ink refill, wherein the opening is provided with a sealing membrane having one or more cuts, and the sealing membrane is configured to prevent ink from flowing out of the ink reservoir and to allow introduction of refill into the ink reservoir, according to any one of the embodiments of the present disclosure, and one or more concentrated ink refills, each of the one or more concentrated ink refills being packed in one of a hydrosoluble pouch, a porous pouch, a meshed pouch, a cage, or a capsule forming a cavity closed by a grid or a water-soluble membrane seal.

In embodiments, a kit comprises a refillable free ink writing instrument comprising a body having a rear end, a front end and an ink reservoir disposed between the rear end and the front end, a writing tip mounted on the front end and a plug mounted on the rear end, wherein the plug is configured to close an opening in fluid communication with the ink reservoir, the plug being configured to be removable from the rear end to refill the ink reservoir with water and concentrated ink refill, wherein the opening is provided with a cartridge receiving portion and the plug comprises a pushing portion configured to push the cartridge toward an opening portion of the cartridge receiving portion when mounting the plug onto the rear end in order to break a portion of the cartridge and free refill into the ink reservoir, according to any one of the embodiments of the present disclosure, and one or more refilling cartridge filled with concentrated ink refill.

In embodiments, a method for refilling a refillable free ink writing instrument comprises, providing a refillable free ink writing instrument according to any one of the embodiments of the present disclosure, removing the plug, refiling the reservoir with water, refiling the reservoir with concentrated ink, and mounting the plug or a new plug on the rear end.

The refill of water may be carried out before or after the refill of concentrated ink. If the refill of concentrated ink is comprised in a portion of the plug, the refill with concentrated ink is carried out simultaneously to the mounting a new plug (the plug or initial plug having no concentrated ink anymore). If the refill of concentrated ink is not comprised in a portion of the plug, the plug may be re-used (i.e. the initial plug may be kept and used again).

Such a refillable free ink writing instrument/kit comprising such a refillable free ink writing instrument/method for refilling such a refillable free ink writing instrument may present an extended lifetime and in a user-friendliness way, in particular easy and clean refill (i.e. may avoid risks of dirt or mess). This may avoid any safety risk by preventing any contact between skin and concentrated ink.

BRIEF DESCRIPTION OF THE DRAWINGS

The disclosure can be better understood by reading the detailed description of various embodiments given as non-limiting examples. The description refers to the accompanying sheets of figures, in which.

DETAILED DESCRIPTION

Figure 1:
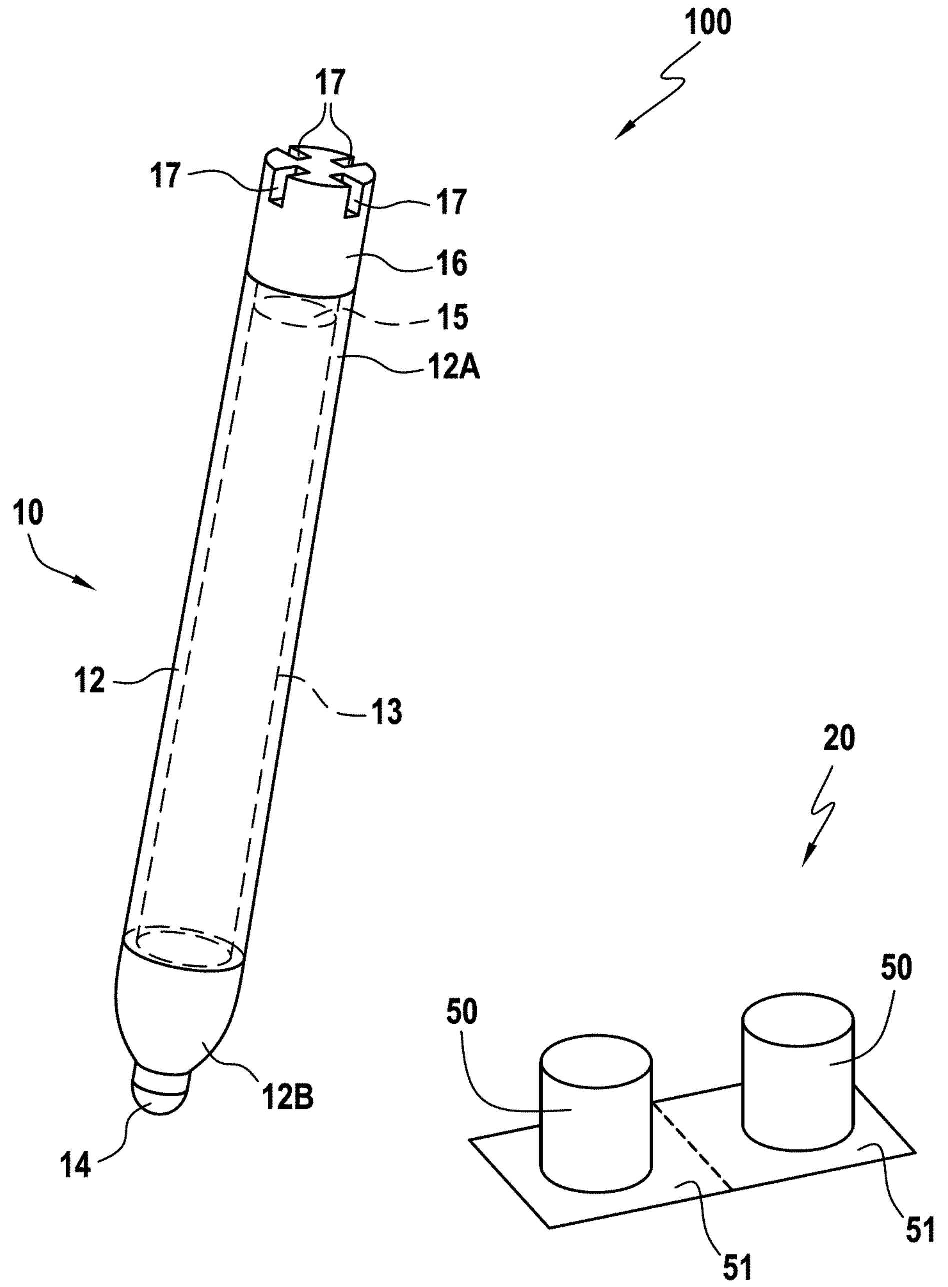
FIG. 1 shows a first embodiment of a refillable free ink writing instrument.

FIG. 1 shows a kit 100 comprising a refillable free ink writing instrument 10 according to a first embodiment and a set 20 of concentrated ink refills 50.

Each refill 50 may be conditioned in an air-tight pouch 51. The air-tight pouches 51 may be all attached and pre-cut in order to be easily separated from each other. For example, the pouches 51 may be made of plastic, aluminium or the like and may comprise a membrane seal or any other means facilitating their opening. In this example, the set 20 comprise two refills 50. However, only one refill or more than two refills may be provided. Each refill 50 may comprise a specific dose of concentrated ink corresponding to the volume of the reservoir 13. In FIGS. 1 to 3D and 4B, the refill 50 is represented as a cylinder for the ease of the drawings, but may have any shape (in particular if the refill is not a single grain or granule).

The writing instrument 10 comprises a body 12 having a rear end 12A, a front end 12B and an ink reservoir 13 disposed between the rear end 12A and the front end 12B. A writing tip 14 is mounted on the front end 12B. A plug 16 is mounted on the rear end 12A. The plug 16 closes an opening 15 in fluid communication with the ink reservoir 13. The plug 16 is removable from the rear end 12A for refill. The plug 16 may comprise indentations 17, in the present example four indentations 17, in order to be open/closed with the help of a dedicated tool (not shown). More or less than four indentations may be provided. Any other shapes of indentation or the like may be possible. The plug 16 may be assembled with the rear end 12A via a screwed, bayonet or snap fitting system. In the followings examples and embodiments, a screwed system is shown, however any other system may be used.

Figure 2A:
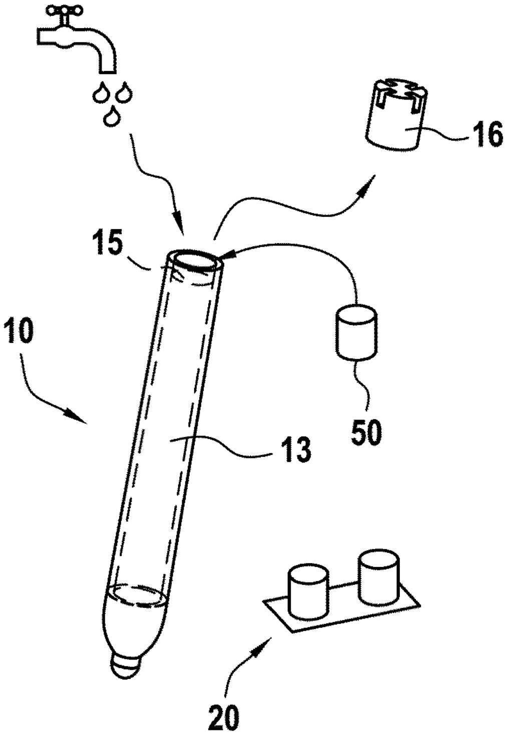
FIGS. 2A to 2C shows a first embodiment of a method for refilling the first embodiment of the refillable free ink writing instrument.
Figure 2B:
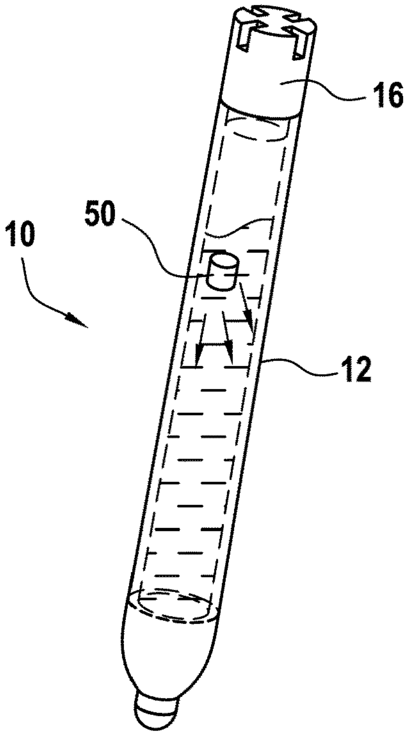
Figure 2C:
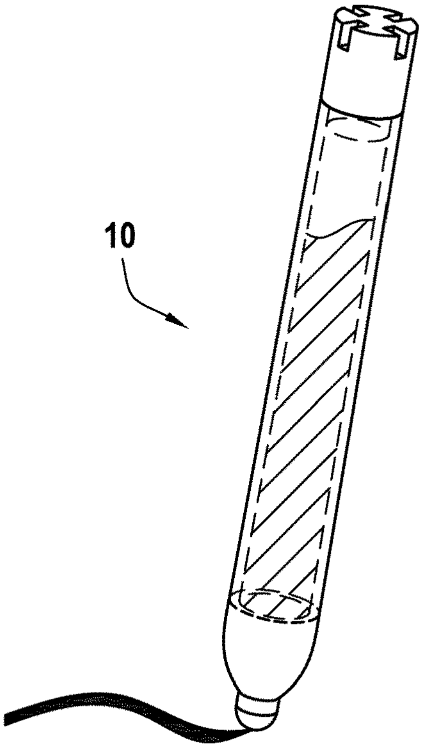

A method according to a first embodiment for refilling the refillable free ink writing instrument 10 is shown in FIGS. 2A to 2C. In FIG. 2A, the plug 16 is first removed. The reservoir 13 may be first refilled with water and after with a refill 50 of concentrated ink. In a variant, the reservoir 13 may be first refilled with a refill 50 of concentrated ink and after with water. In this example, the refill 50 of concentrated ink is directly placed into the reservoir 13 via the opening 15. In examples, before refilling, rest(s) of a former refill 50 may be removed. Then, the plug 16 (i.e. the same plug 16 initially removed) is mounted onto the rear end 12A (see FIG. 2B). When the refill 50 and water are mixed, the refill 50 dilutes (as shown in FIG. 2B), then forming ink ready to feed the writing tip 14 (see FIG. 2C).

Different examples of refill packaging are shown in FIGS. 3A to 3E.

Figure 3A:
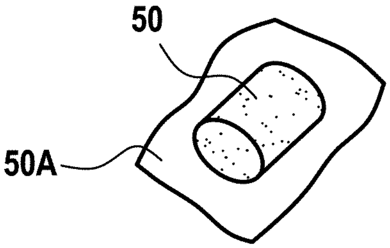
FIG. 3A to 3E show different packaging of concentrated ink refills.

In FIG. 3A, the refill 50 may be packed in a hydrosoluble pouch 50A (which is distinct from the air-tight pouches 51). The refill 50 and the hydrosoluble pouch 50A may form a unit which is directly used when refilling the writing instrument 10 with concentrated ink (i.e. the unit may be directly placed into the reservoir 13). With such a packaging, the concentrated ink refill 50 may be powder and/or one or more solid grains or granules.

Figure 3B:
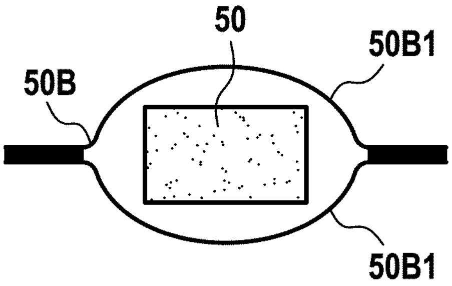
Figure 3C:
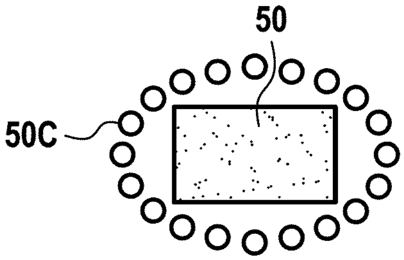

In FIG. 3B, the refill 50 may be packed in a porous pouch 50B (which is distinct from the air-tight pouches 51). The porous pouch 50B may comprise two layers 50B1 of welded papers. The refill 50 and the porous pouch 50B may form a unit which is directly used when refilling the writing instrument 10 with concentrated ink (i.e. the unit may be directly placed into the reservoir 13). With such a packaging, the concentrated ink refill 50 may be powder and/or one or more solid grains or granules.

Figure 3D:
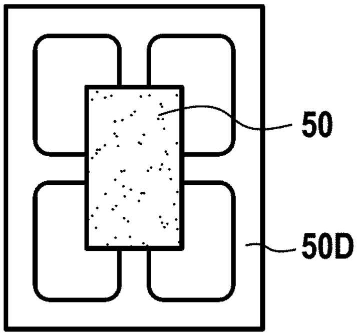

In FIG. 3D, the refill 50 may be packed in a cage 50D (which is distinct from the air-tight pouches 51). For example the cage 50D may be made of plastic. The refill 50 and the cage 50D may form a unit which is directly used when refilling the writing instrument 10 with concentrated ink (i.e. the unit may be directly placed into the reservoir 13). With such a packaging, the concentrated ink 50 may be one or more solid grains or granules.

Figure 3E:
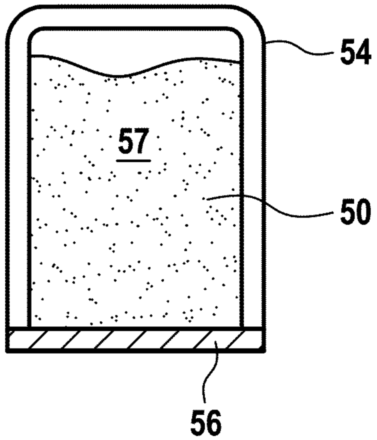

In FIG. 3E, the refill 50 may be packed in a capsule 54 (which is distinct from the air-tight pouches 51). The refill 50 and the capsule 54 may form a unit which is directly used when refilling the writing instrument 10 with concentrated ink. The capsule 54 may form a cavity 57 which may be closed by an element 56 which may be a grid, a breakable membrane seal, a water-soluble membrane seal, or a movable cover. A capsule 54 closed by a grid or a water-soluble membrane seal may be directly used when refilling the writing instrument 10 with concentrated ink (i.e. the capsule 54 may be directly placed into the reservoir 13). When closed with a grid, the concentrated ink refill 50 may be one or more solid grains or granules. When closed with a water-soluble membrane seal, the concentrated ink refill 50 may be powder and/or one or more solid grains or granules. FIG. 3E shows an example of powder concentrated ink. A capsule 54 closed by a breakable membrane seal may be used similarly to the example of FIGS. 7A and 7B described below. A capsule 54 closed by a movable cover may be used similarly to the example of FIGS. 10A to 12D described below. In these two latter cases, the concentrated ink refill 50 may be liquid or powder.

Figure 4A:
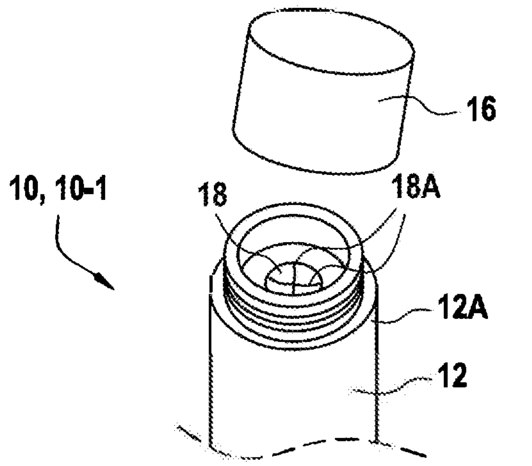
FIGS. 4A to 4C show a first variant of the first embodiment of the refillable free ink instrument.
Figure 4B:
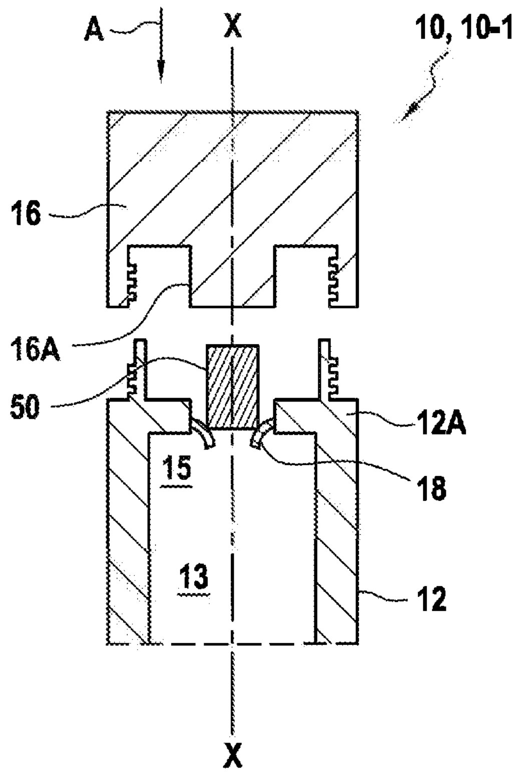
Figure 4C:
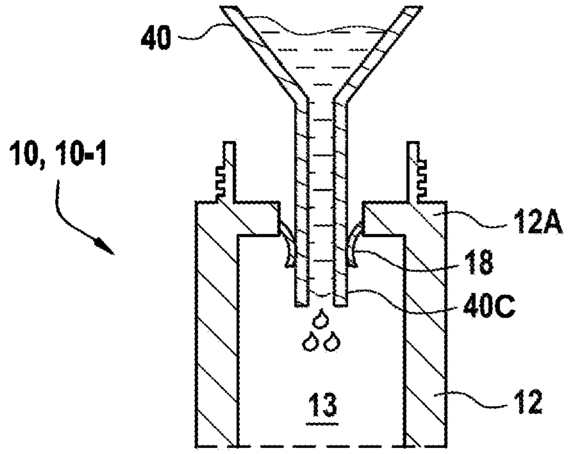

FIGS. 4A to 4C show a first variant 10-1 of the first embodiment of the refillable free ink instrument 10. In the first variant 10, 10-1, the opening 15 (or rear end 12A or body 12) may be provided with a sealing membrane 18 having one or more cuts 18A, in the present example four radial cuts 18A. More or less than four cuts may be provided, in any configuration. The sealing membrane 18 is configured to prevent ink from flowing out of the ink reservoir 13 and to allow introduction of refill into the ink reservoir 13. The plug 16 may comprise a pushing portion 16A, in this example a protrusion extending along the axis X of the writing instrument 10 toward the ink reservoir 13. The pushing portion 16A is configured to push a solid concentrated ink refill through the membrane 18 when mounting the plug 16 onto the rear end 12A. For example, a solid concentrated ink refill may be one or more solid grains or granules of concentrated ink, or any refill 50 packaged as in the above example shown in FIGS. 3A to 3E.

For refilling the first variant 10, 10-1, after having removed the pug 16, the solid concentrated ink in placed onto the membrane 18 and is pushed through the membrane 18 into the reservoir 13, for example by hand or with the help of the plug 16 and its pushing member 16A as shown in FIG. 4B (see arrow A). For refilling water, a funnel 40 may be used as shown in FIG. 4C, the output 40C of the funnel 40 extending through the membrane 18 and opening directly into the reservoir 13. The membrane 18 may prevent leaks from the reservoir 13 when the plug 16 is removed, during refill or by mistake.

Figure 5A:
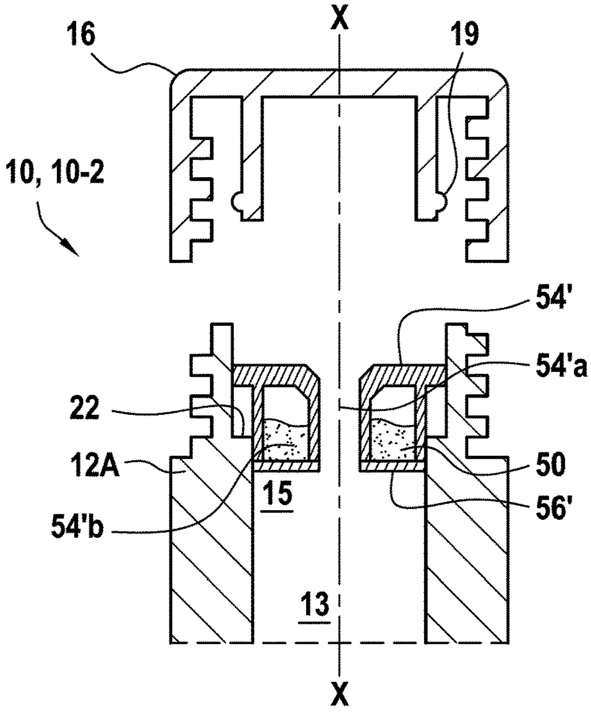
FIGS. 5A and 5B show a second variant of the first embodiment of the refillable free ink instrument.
Figure 5B:
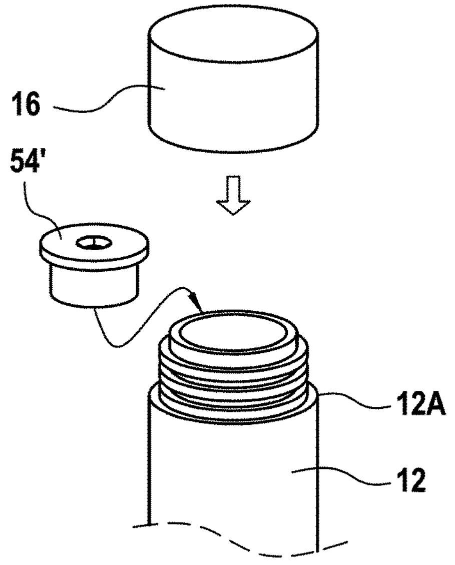

FIGS. 5A and 5B show a second variant 10-2 of the first embodiment of the refillable free ink instrument 10. In the second variant 10, 10-2, the opening 15 (or rear end 12A, or body 12) may be provided with a capsule receiving portion 22 configured to hold a capsule 54' having a shape of a funnel for refilling water into the reservoir 13. The capsule receiving portion may comprise a shoulder 22. The capsule 54' may have an annular shape and a central axial through hole **54'*a* having a shape of a funnel configured to open into the reservoir 13. The capsule 54' may have an annular cavity 54'*b* configured to store concentrated ink. Similarly to the capsule 54, the cavity of the capsule 54' may be closed by an element 56' which may be a grid, a breakable membrane seal, a water-soluble membrane seal, or a movable cover. In the example shown in FIGS. 5A and 5B, the element 56' is a water-soluble membrane seal. With such a capsule 54', the user may refill with water before or after having placed the capsule 54' into the receiving portion 22. FIG. 5A shows an example of powder concentrated ink refill 50. A seal 19 may be arranged on the plug 16 in order to prevent any leakage between the plug 16 and the body 12, when the plug 16 is mounted onto the rear end 12**A.

For refilling the second variant 10, 10-2, after having removed the plug 16, the former capsule 54' is removed first, a new capsule 54' is provided an placed in the capsule receiving portion 22 (thereby refilling the reservoir 13 with concentrated ink) as shown in FIG. 5B, and the capsule 54' is used as funnel for refilling the reservoir 13 with water. In examples, the reservoir 13 may be refilled with water first, and then a new capsule 54' may be provided. In examples, after providing the new capsule 54', the level of water into the reservoir 13 may be adjusted (i.e. water added). The plug 16 (i.e. the same plug as initially removed for refill) is then mounted onto the rear end 12A. The water-soluble seal-membrane 56' dissolves at least in part when contacting water, thus releasing the concentrated ink refill 50 into the reservoir 13.

Figure 6:
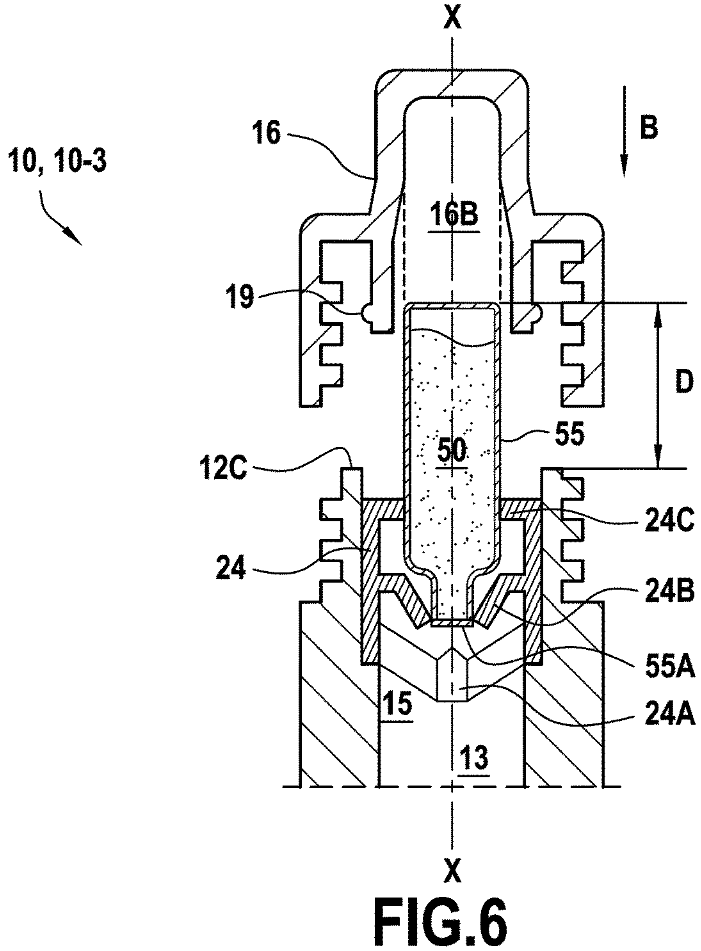
FIG. 6 shows a third variant of the first embodiment of the refillable free ink instrument.

FIG. 6 shows a third variant 10-3 of the first embodiment of the refillable free ink instrument 10. In the third variant, the opening 15 (or rear end 12A or the body 12) may be provided with a cartridge receiving portion 24 comprising an opening portion 24A. The plug 16 comprises a pushing portion 16B configured to move toward the opening portion 24A of the cartridge receiving portion 24 when mounting the plug 16 onto the rear end 12A. This way, when a cartridge 55 is being replaced, the pushing portion 16B is configured to push the cartridge 55 toward the opening portion 24A of the cartridge receiving portion 24 when mounting the plug 16 onto the rear end 12A in order to break a portion 55A (a breakable portion) of the cartridge 55 and free refill 50, in the present example concentrated ink refill 50, into the ink reservoir 13. In the present example, the cartridge receiving portion 24 may be configured to cooperate in form fitting manner with the cartridge 55, for example a front end portion of the cartridge 55. In the present example, the opening portion may be a sharp protrusion 24A, such as a pin, a punch or the like. The pushing portion 16B may be configured to cooperate in form fitting manner with the cartridge 55, for example a rear end portion of the cartridge 55. For example, in the frame of the kit 100 show in FIG. 1, the cartridges 55 may be not provided in individual air-tight pouches 51. For example, the cartridges 55 may be provided all together in a single box or packaging. With such a cartridge 55, the concentrated ink refill 50 may be liquid or powder (powder being shown in FIG. 6).

For refilling the third variant 10, 10-3, after having removed the plug 16, the former (empty) cartridge 55 is removed first. Then the reservoir 13 is refilled with water. Then, a new cartridge 55 is provided an placed in the cartridge receiving portion 24 (thereby refilling the reservoir 13 with concentrated ink) and the plug 16 (i.e. the same plug as initially removed for refill) is then mounted onto the rear end 12A, thereby pushing the cartridge 55 toward the opening portion 24A (see arrow B in FIG. 6) and breaking the portion 55A and releasing the concentrated ink refill 50 into the reservoir 13.

In this example, when mounted onto the writing instrument 10, the cartridge 55 may protrude axially from the edge 12C of the body 12, for example of a predetermined distance D. This may allow an easy griping by the user when removing a used cartridge 55. The cartridge receiving portion 24 may comprise a first portion 24B configured to cooperate with a front end of the cartridge 55 and sealing ring 24C configured to cooperate with a body of the cartridge 55. This may provide an air and water tightness with the matching surfaces of the cartridge 55. No water or ink may leak between the cartridge 55 and the cartridge receiving portion 24. When refill, the empty cartridge 55 may be handled without ink contact on fingers.

Figure 7A:
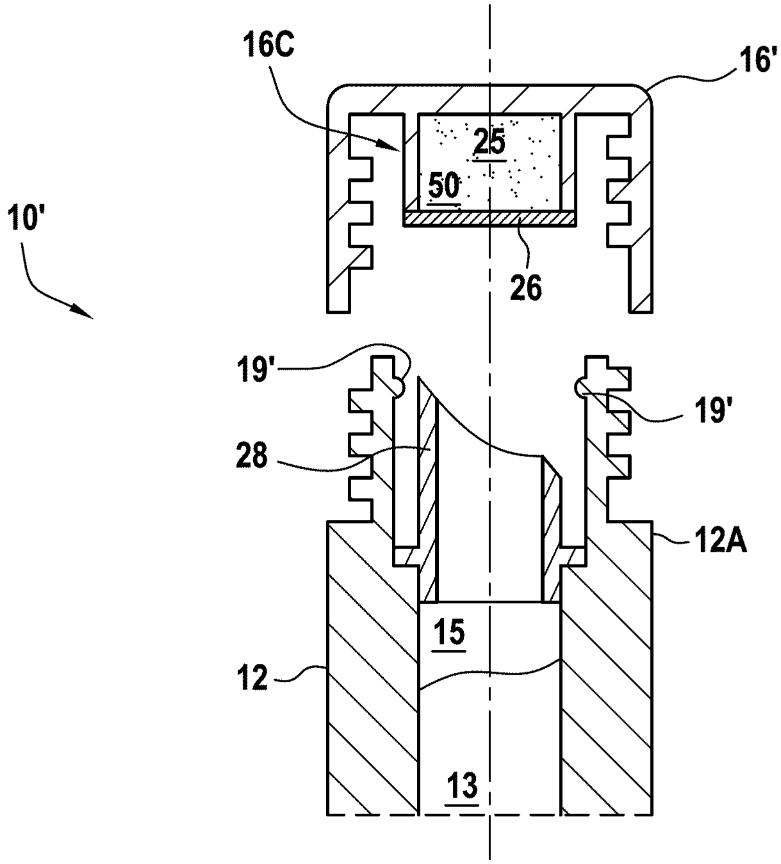
FIGS. 7A and 7B show a second embodiment of a refillable free ink instrument.
Figure 7B:
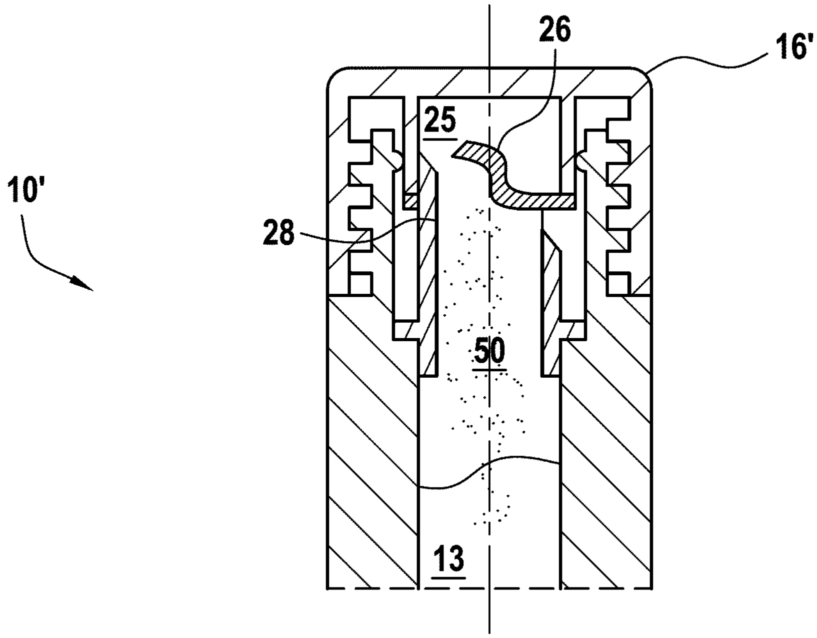

FIGS. 7A and 7B show a refillable free ink instrument 10' according to a second embodiment. The main difference with between the refillable free ink instrument 10 according to a first embodiment and the refillable free ink instrument 10' according to a second embodiment is that the plug 16' of ink instrument 10' is provided with a portion 16C configured to be in fluid contact with the ink reservoir 13, the portion 16C comprising a cavity 25 configured to store concentrated ink refill 50. The common elements between the first and the second embodiment 10 and 10' have the same reference signs and are not described (or shown) again.

In the second embodiment 10', the concentrated ink refill 50 may comprise a liquid, a powder and/or one or more solid grains or granules (powder being shown in the FIGS. 7A and 7B), and the cavity 25 is closed by a breakable membrane seal 26. The body 12 (or the opening 15 or the rear end 12A) may comprise a single sharp element 28 configured to cut the breakable membrane seal 26 when mounting the plug 16' onto the rear end 12A so as to open the cavity 25, thereby releasing the concentrated ink refill 50 into the reservoir 13. In this example, the body 12 may comprise a single blade 28 configured to cut the breakable membrane seal 26 when the plug 16' in mounted. A seal 19' may be arranged on body 12 in order to prevent any leakage between the plug 16' and the body 12', when the plug 16' is mounted onto the rear end 12A'.

Figure 8A:
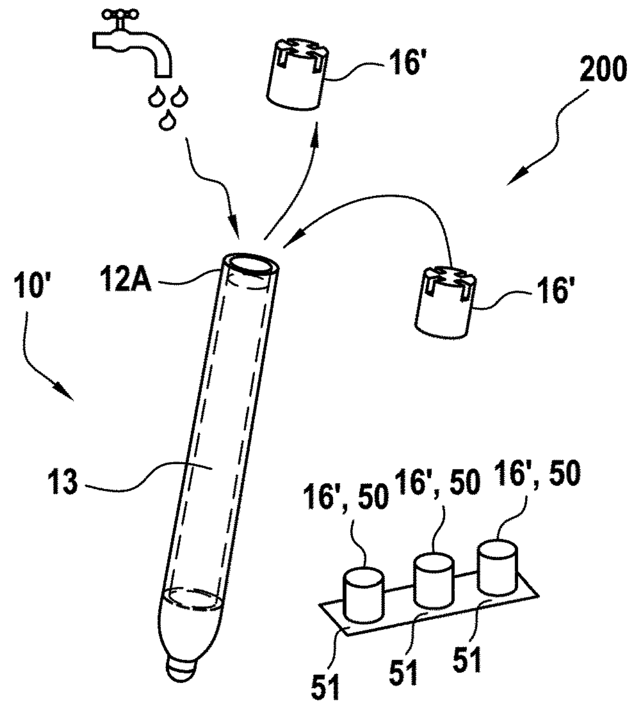
FIGS. 8A to 8C show a second embodiment of a method for refilling the second embodiment of the refillable free ink writing instrument
Figure 8B:
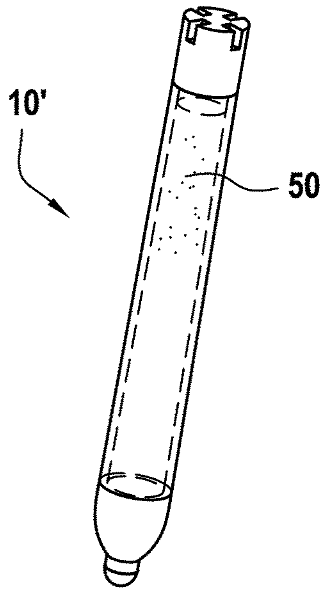
Figure 8C:
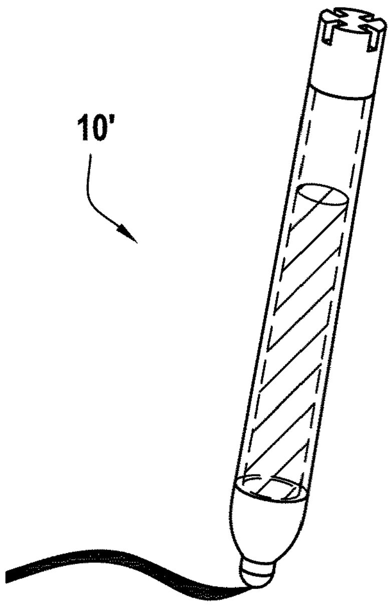

FIGS. 8A to 8C show a method according to a second embodiment for refilling the refillable free ink writing instrument 10'. FIG. 8A shows a kit 200 comprising a refillable free ink writing instrument 10' wherein each concentrated in refill 50 is packaged in a replacement plug 16' (or additional plug 16') similar to the plug 16' while the replacement plugs 16' may be each packaged in an air-tight pouch 51, in the same way as shown in FIG. 1.

In FIG. 8A, the used plug 16' is first removed. The reservoir 13 may be first refilled with water. Then, a replacement plug 16' (i.e. a new plug 16' which is not the plug 16' initially removed) is mounted onto the rear end 12A (see FIG. 8B), thereby providing a refill of concentrated ink 50 when the sharp element 28 cut the breakable membrane seal 26 and release concentrated ink refill 50 into the reservoir 13. The refill 50 and water thus mix, then forming ink ready to feed the writing tip 14 (see FIG. 8C).

Figure 9A:
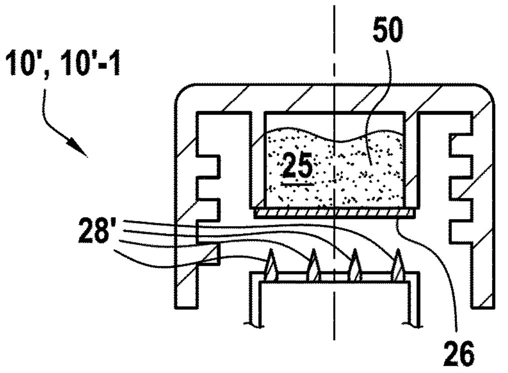
FIGS. 9A to 9D show four different variants of the second embodiment of the refillable free ink instrument.

FIG. 9A shows a first variant 10'-1 of the second embodiment of the refillable free ink instrument 10' wherein the single sharp element 28 is replaced by a plurality of sharp elements 28'. For example, each of the sharp elements 28' may be a sharp punch. This may produce better interaction between concentrated ink refill 50 and water for a faster mix. The method for refill is the same as disclosed with reference to FIGS. 8A to 8C.

Figure 9B:
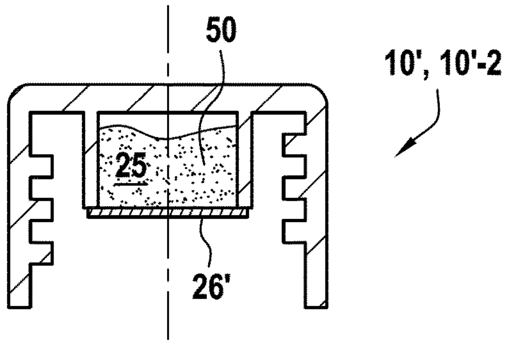

FIG. 9B shows a second variant 10'-2 of the second embodiment of the refillable free ink instrument 10', having no sharp element, and the cavity 25 may be closed by a water-soluble membrane seal 26'. The concentrated ink refill 50 may comprise a powder and/or one or more solid grains or granules (powder being shown in FIG. 9B). The method for refill is the same as disclosed with reference to FIGS. 8A to 8C, except that instead of breaking/cutting a membrane seal, the water-soluble membrane seal 26' dissolves at least in part when contacting the water refilled into the reservoir 13, thereby releasing the concentrated ink refill 50 into the reservoir 13.

Figure 9C:
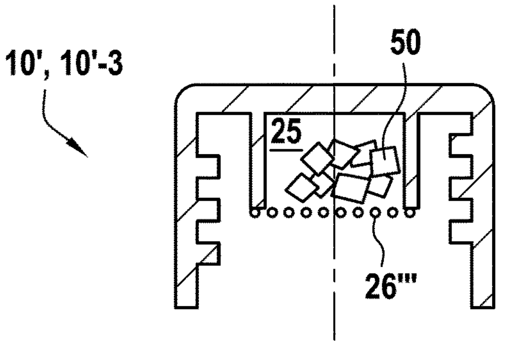

FIG. 9C shows a third variant 10-3 of the second embodiment of the refillable free ink instrument 10', having no sharp element, and the cavity 25 may be closed by a grid 26''. The concentrated ink refill 50 may comprise one or more solid grains or granules (a plurality of grains being shown in FIG. 9C). The method for refill is the same as disclosed with reference to FIGS. 8A to 8C, except that instead of breaking/cutting a membrane seal, the grid 26—allows contact between the water refilled into the reservoir 13 and the concentrated ink refill 50, thereby mixing ink refill 50 and water and forming ink ready to feed the writing tip 14.

Figure 9D:
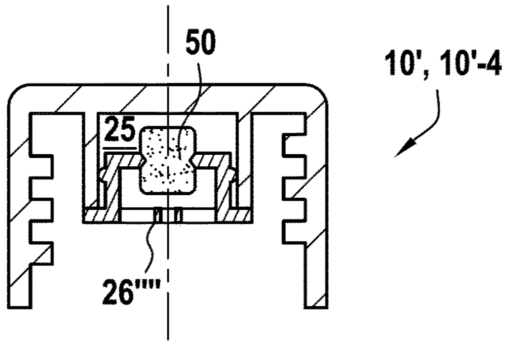

FIG. 9D shows a fourth variant 10', 10'-4 of the second embodiment of the refillable free ink instrument 10', having no sharp element, and the cavity 25 may be closed by a grid 26'''. The grid 26—may be part of a cage received into the cavity 25. The concentrated ink refill 50 may comprise one or more solid grains or granules. In the example shown in FIG. 9D, the concentrated ink comprises a single grain or granule (or pellet). The method for refill is the same as disclosed with reference to FIGS. 8A to 8C, except that instead of breaking/cutting a membrane seal, the grid 26—allows contact between the water refilled into the reservoir 13 and the concentrated ink refill 50, thereby mixing ink refill 50 and water and forming ink ready to feed the writing tip 14.

Figure 10A:
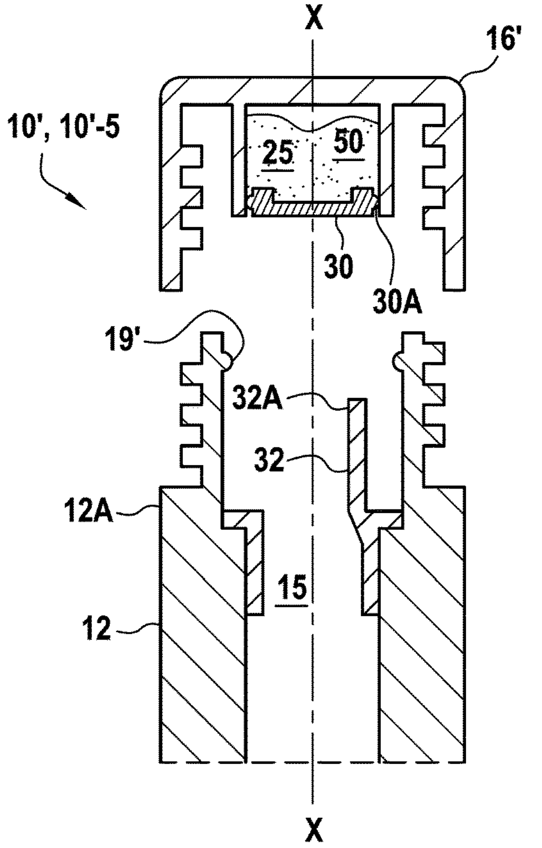
FIGS. 10A to 10E show a fifth variant of the second embodiment of the refillable free ink instrument.
Figure 10B:
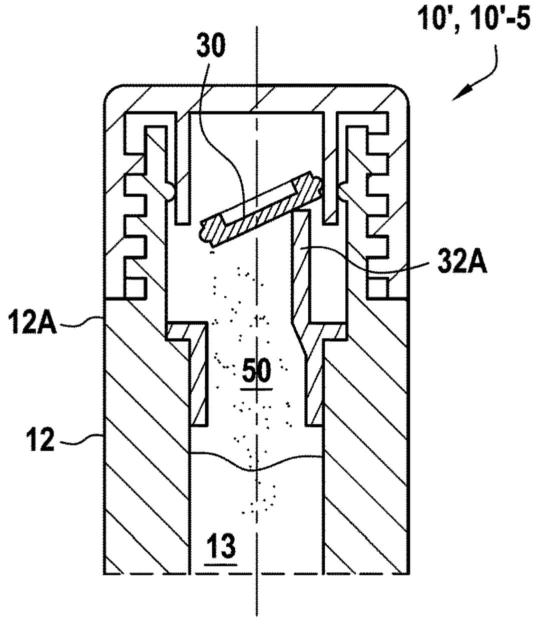

FIGS. 10A and 10B show a fifth variant 10'-5 of the second embodiment of the refillable free ink instrument 10', having no sharp element, and the cavity 25 may be closed by a movable cover 30. The body 12 (or the opening 15 or the rear end 12A) may comprise one or more moving element 32, in this example a single moving element 32, configured to move the movable cover 30 when mounting the plug 16' onto the rear end 12A so as to open the cavity 25. The concentrated ink refill 50 may comprise a liquid, a powder and/or one or more solid grains or granules (powder being shown in FIG. 10A to 10E).

Figure 10C:
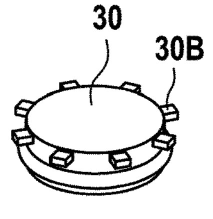
Figure 10D:
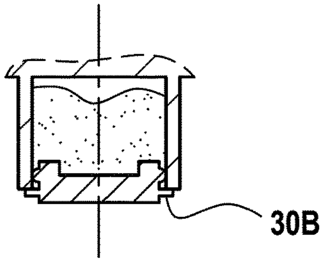
Figure 10E:
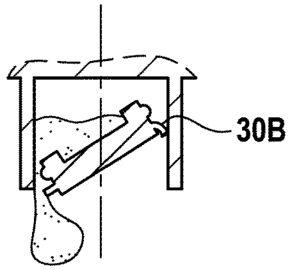

The movable cover 30 may be made of plastic or elastomeric material and may provide air tightness due to, for example a sealing ring 30A. In this example, moving element 32 is configured to push this sealing ring 30A in a way to tilt it when the plug 16' mounted on the rear end 12A (see FIG. 10B). For example, the moving element 32 may comprise a single axial protrusion 32A, which may be as radially distant as possible form the axis X of the body 12 in order to increase the moment arm when cooperating with the movable cover 30. As shown in FIG. 10C to 10E, the movable cover 30 may be provided with breakable and/or bendable radial tongues 30B which may help the movable cover 30 to remain stable during transportation and first assembly in factory. These radial tongues 30B may be thin and may be broken or bent when the plug 16' is mounted on the rear end 12A, due to the action of the moving element 32.

The method for refill is the same as disclosed with reference to FIGS. 8A to 8C, except that instead of breaking/cutting a membrane seal, the movable cover 30 is tilted by the moving element 32 when mounting the plug 16', thereby releasing concentrated ink refill 50 into the reservoir 13 (see FIG. 10B or 10E).

Figure 11A:
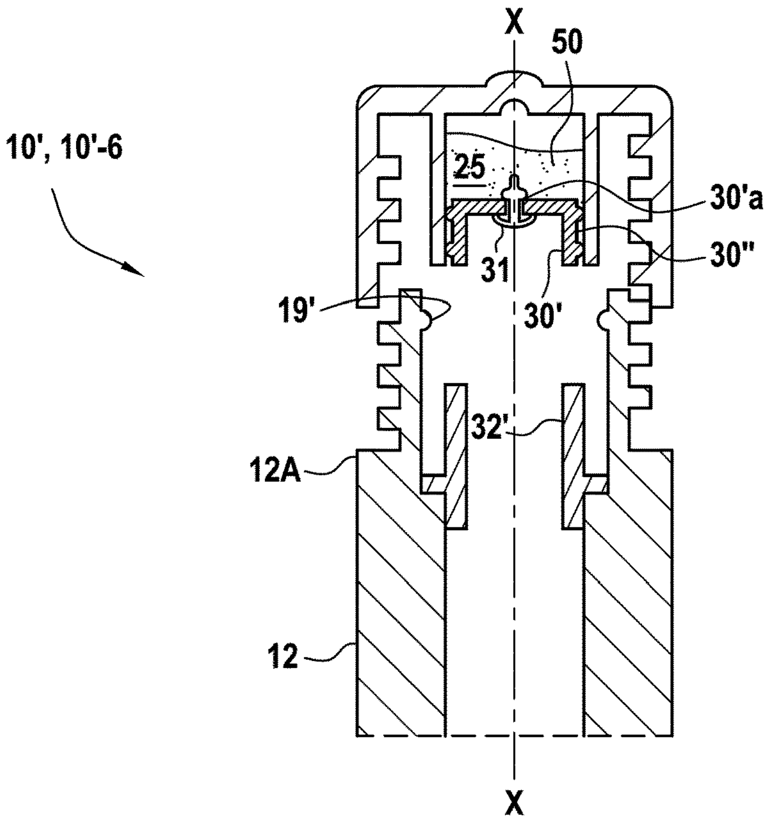
FIGS. 11A and 11B show a sixth variant of the second embodiment of the refillable free ink instrument.
Figure 11B:
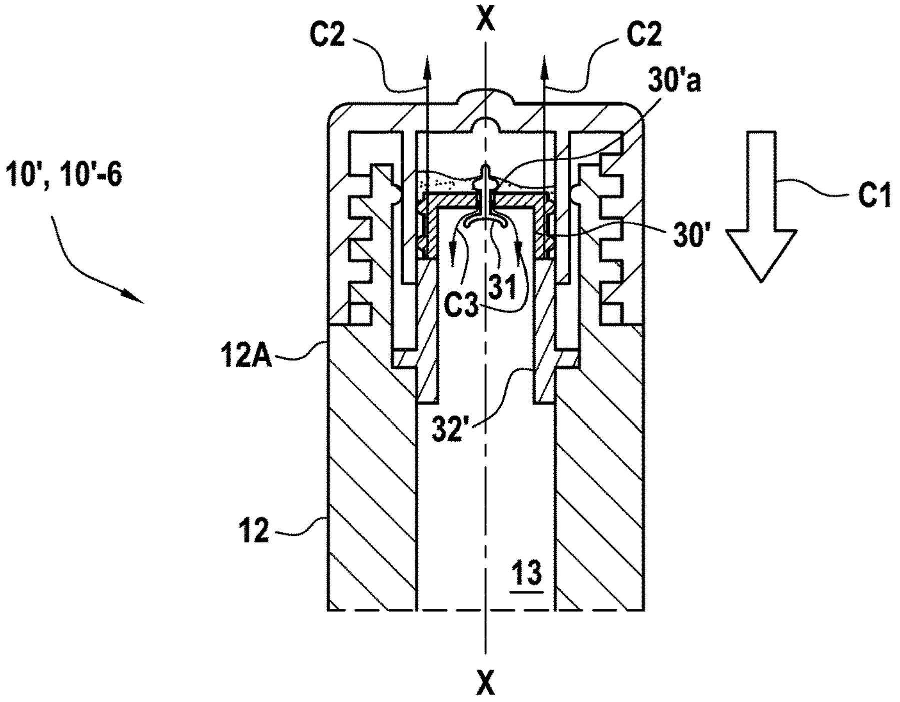

FIGS. 11A and 11B show a sixth variant 10'-6 of the second embodiment of the refillable free ink instrument 10'. In the same way as the fifth variant 10', 10'-5, the sixth variant 10', 10'-6 has no sharp element, and the cavity 25 may be closed by a movable cover 30'. The concentrated ink refill 50 may comprise a liquid, a powder and/or one or more solid grains or granules (powder being shown in FIGS. 11A and 11B).

In this example, the movable member 30' may be a piston provided with a valve 31 closing a passage 30'*a*. In the rest position, the valve 31 close the passage 30'*a*. The valves 31 may be an umbrella membrane. This assembly may be airtight. The moving element 32' may be configured to push the piston 30' rearward when mounting the plug 16'. For example, the moving element may comprise an annular projection 32' configured to axially cooperated with (or to push) a skirt 30" of the piston 30', in order to move rearward the piston 30'.

The method for refill is the same as disclosed with reference to FIGS. 8A to 8C, except that instead of breaking/cutting a membrane seal, the movable cover 30' is pushed rearward by the moving element 32' when mounting the plug 16' (see FIG. 11B). When mounting the plug 16' on the rear end 12A, (arrows C) the movable cover 304 is moved rearward (arrow C2) and the pressure into the cavity 25 rises, opening the valve 31 and releasing the concentrated ink refill 50 into the reservoir 13 via the passage 30'*a* (arrow C3). In order to prevent leakages, the plug 16' and the movable member 30' are configured so that the valve 31 remains closed when the plug 16' is mounted onto the rear end 12A and that the concentrated ink refill 50 has been released into the reservoir.

Figure 12A:
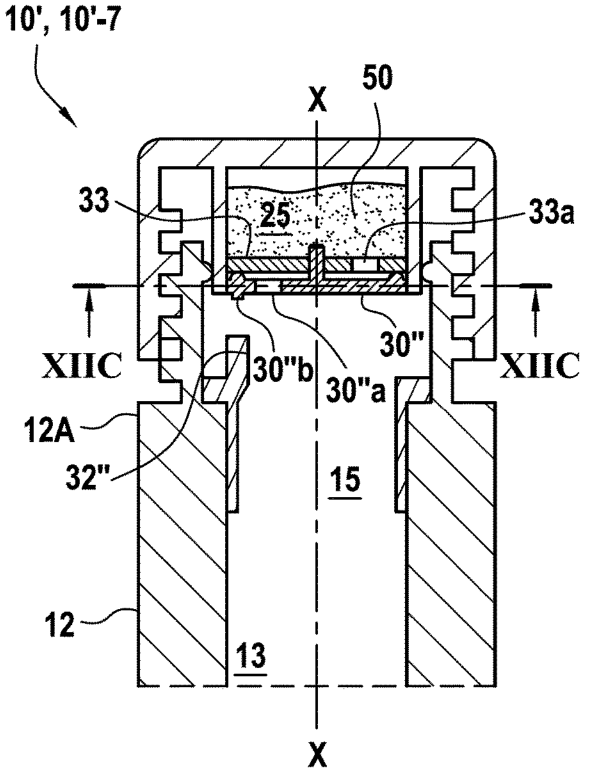
FIGS. 12A to 12D show a seventh variant of the second embodiment of the refillable free ink instrument.
Figure 12B:
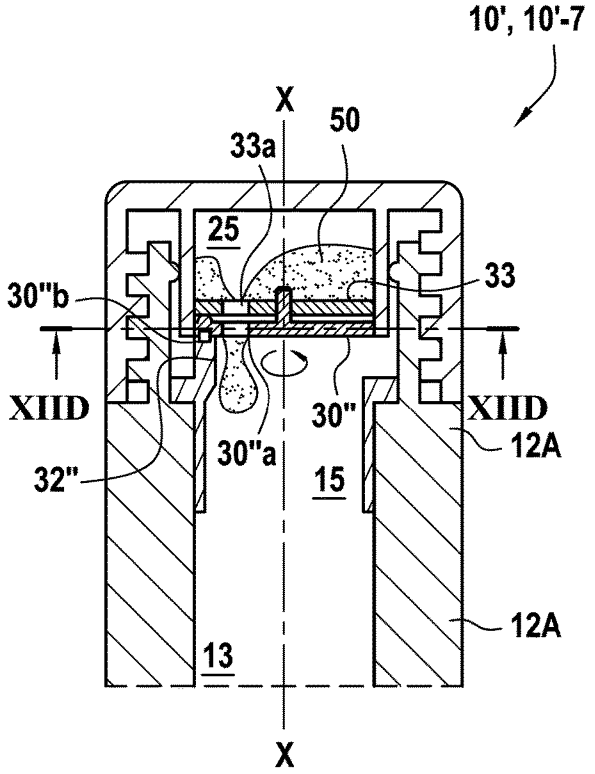
Figure 12C:
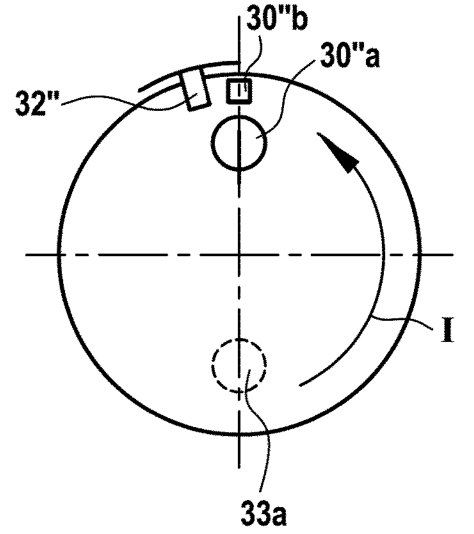
Figure 12D:
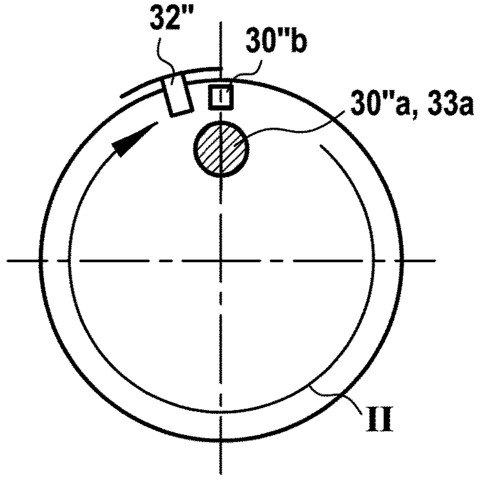

FIGS. 12A and 12C show a seventh variant 10'-7 of the second embodiment of the refillable free ink instrument 10'. In the same way as the fifth and sixth variants 10', 10'-5, 10', 10'-6, the seventh variant 10', 10'-7 has no sharp element, and the cavity 25 may be closed by a movable cover 30". The concentrated ink refill 50 may comprise a liquid, a powder and/or one or more solid grains or granules (powder being shown in FIGS. 12A and 12B).

The movable cover 30" may be rotatable disc having a single through hole 30"*a*. In a variant, the rotatable disc 30" may have more than one through hole. The rotatable disc 30" may be mounted rotatable on a fixed plate 33 closing the cavity 25. The fixed plate 33 may be fixed with regard to the rest of the plug 16'. The fixed plate 33 may have a single through hole 33*a*. In a variant, the fixed plate 33 may have more than one through hole. Depending on the relative position between the rotatable disc 30" and the fixed plated 33, the through hole 30"*a* and the thought hole 33*a* may be axially aligned (see FIGS. 12B and 12D) or not (see FIGS. 12A and 12C). In other words, depending on the relative position between the rotatable disc 30' and the fixed plated 33 the cavity 25 may be open or closed. The rotatable disc 30" may comprise any coupling element configured to rotatably couple the rotatable disc 30" with the body 12 (or the rear end 12A) when mounting/removing the plug 16' onto/from the rear end 12A. For example, the rotatable disc 30" may comprise an abutment 30"*b* configured abut in a circumferential direction (around the axis X of the body, see arrow I and II in FIGS. 12C and 12D) against a complementary abutment 32" forming a moving element. When the plug 16' is not mounted onto the body 12, the thought holes 30"*a* and 33*a* are not aligned.

The method for refill is the same as disclosed with reference to FIGS. 8A to 8C, except that instead of breaking/cutting a membrane seal, the movable cover 30" is turned relatively to the rest of the plug 16' by rotating the plug 16' with regard to the body 12, for example when mounting via a screwed system. The abutments 30"*b* and 32" thus cooperates in order to align the through holes 30"*a* and 33*a* (see arrow I of FIGS. 12C), thereby aligning the through holes 30"*a* and 33*a* (see configuration of FIGS. 12B and 12D) and realising the concentrated ink refill 50 into the reservoir and/or allowing the water to penetrate into the reservoir, thereby mixing the concentrated ink refill 50 with water and forming ink ready to feed the writing tip 14. When removing the plug 16', the abutments 30"*b* and 32" cooperate ((see arrow II of FIG. 12D) in order to des-align the through holes 30"*a* and 33*a*, thereby closing the cavity 25. This may avoid messiness: when the user remove the plug 16', remaining's drop of ink are captured and cannot fall, and if the user forget to put water in the reservoir and just re-open the end-plug whereas it is not void, the rest of concentrated ink cannot fall and touch the user skin.

In variants not shown, the cavity 25 may be configured to store any capsule a disclosed in the present disclosure with reference to FIG. 3E. In such a case, the cavity 25 is configured to store concentrated ink via a capsule 54. Thus, in the above examples, a new capsule is provided instead of a new plug, and the method comprises removing the former (used) capsule from the cavity 25 and providing a replacement (new) capsule into the cavity 25. The rest of the method may be similar.

Although the present disclosure is described with reference to specific examples, it is clear that modifications and changes may be made to these examples without going beyond the general scope of the disclosure. In particular, individual characteristics of the various embodiments shown and/or mentioned may be combined in additional embodiments. Consequently, the description and the drawings should be considered in a sense that is illustrative rather than restrictive.

For example, any features disclosed with regard to the capsules of the first embodiment may apply to the plugs of the second embodiment while any features disclosed with regard to the plugs of the second embodiment may apply to the capsules of the first embodiment.

Additionally, all of the disclosed features of an apparatus may be transposed, alone or in combination, to a method and vice versa.

The invention claimed is:

1. A refillable free ink writing instrument comprising a body having a rear end, a front end and an ink reservoir disposed between the rear end and the front end, a writing tip mounted on the front end and a plug mounted on the rear end, wherein the plug is configured to close an opening in fluid communication with the ink reservoir, the plug being configured to be removable from the rear end to refill the ink reservoir with water and concentrated ink refill, wherein the opening is provided with a sealing membrane having one or more cuts configured to allow elastic deformation of the sealing membrane when a predetermined pressure is applied thereto, and the sealing membrane is configured to adopt to states, a rest state in which the membrane prevents ink from flowing out of the ink reservoir and a working state in which the membrane allows introduction of water and of the concentrated ink refill into the ink reservoir.

2. The refillable free ink writing instrument according to claim 1, wherein the plug comprises a portion configured to be in fluid contact with the ink reservoir, the portion comprising a cavity configured to store the concentrated ink refill.

3. The refillable free ink writing instrument according to claim 2, wherein the cavity is configured to store one or more solid grains or granules, and the cavity is closed by a grid.

4. The refillable free ink writing instrument according to claim 2, wherein the cavity is configured to store a powder and/or one or more solid grains or granules, and the cavity is closed by a water-soluble membrane seal.

5. The refillable free ink writing instrument according to claim 2, wherein the cavity is configured to store a liquid, a powder, or one and/or more solid grains or granules, the cavity is closed by breakable membrane seal.

6. The refillable free ink writing instrument according to claim 2, wherein the cavity is configured to store a liquid, a powder and/or one or more solid grains or granules, the cavity is closed by a movable cover).

7. A kit comprising a refillable free ink writing instrument according to claim 2 and one or more additional plugs, wherein each of the one or more additional plugs is packed in an air-tight pouch.

8. The refillable free ink writing instrument according to claim 1, wherein the plug comprises a pushing portion configured to push a solid concentrated ink refill through the membrane when mounting the plug onto the rear end.

9. The refillable free ink writing instrument according to claim 1, wherein the opening is provided with a cartridge receiving portion, the cartridge receiving portion comprising an opening portion and the plug comprises a pushing portion configured to move toward the opening portion of the cartridge receiving portion when mounting the plug onto the rear end.

10. The refillable free ink writing instrument according to claim 1, wherein the one or more cuts are radial cuts.

11. A kit comprising a refillable free ink instrument according to claim 1 and one or more concentrated ink refills, each of the one or more concentrated ink refills being packed in one of a hydrosoluble pouch, a porous pouch, a meshed pouch, a cage, or a capsule forming a cavity closed by a grid, a breakable membrane seal, a water-soluble membrane seal, or a movable cover.

12. The kit of claim 11, wherein each of the one or more concentrated ink refills is packed in a capsule having a shape of a funnel for refilling water into the reservoir.

13. A kit comprising a refillable free ink writing instrument according to claim 1 and one or more concentrated ink refills, each of the one or more concentrated ink refills being packed in one of a hydrosoluble pouch, a porous pouch, a meshed pouch, a cage, or a capsule forming a cavity closed by a grid or a water-soluble membrane seal.

14. A kit comprising a refillable free ink writing instrument according to claim 1 and one or more refilling cartridges filled with concentrated ink refill.

15. A method for refilling a refillable free ink writing instrument comprising:

providing the refillable free ink writing instrument according to claim 1,
removing the plug,
refilling the reservoir with water,
refilling the reservoir with concentrated ink, and
mounting the plug or a new plug on the rear end.

16. A refillable free ink writing instrument comprising a body having a rear end, a front end and an ink reservoir disposed between the rear end and the front end, a writing tip mounted on the front end and a plug mounted on the rear end, wherein the plug is configured to close an opening in fluid communication with the ink reservoir, the plug being configured to be removable from the rear end to refill the ink reservoir with water and concentrated ink refill, wherein the plug comprises a portion configured to be in fluid contact with the ink reservoir, the portion comprising a cavity configured to store the concentrated ink refill, wherein the concentrated ink refill comprises a powder and/or one or more solid grains or granules, and the cavity is closed by a water-soluble membrane seal.

17. A refillable free ink writing instrument comprising a body having a rear end, a front end and an ink reservoir disposed between the rear end and the front end, a writing tip mounted on the front end and a plug mounted on the rear end, wherein the plug is configured to close an opening in fluid communication with the ink reservoir, the plug being configured to be removable from the rear end to refill the ink reservoir with water and concentrated ink refill, wherein the opening is provided with a cartridge receiving portion, the cartridge receiving portion comprising an opening portion and the plug comprises a pushing portion configured to move toward the opening portion of the cartridge receiving portion when mounting the plug onto the rear end.

* * * * *